United States Patent [19]
Bitterlich et al.

[11] 3,712,737
[45] Jan. 23, 1973

[54] TELESCOPIC OPTICAL INSTRUMENT

[76] Inventors: Walter Bitterlich, Rennbahnstrasse 4A; Benno Hesske, Krevzbergpromenade 9, both of Salzburg, Austria

[22] Filed: Sept. 28, 1971

[21] Appl. No.: 184,601

[30] Foreign Application Priority Data

Oct. 5, 1970 Austria............................8948/70

[52] U.S. Cl. ..........................356/8, 350/10, 350/27, 350/33, 350/50, 356/20, 356/142
[51] Int. Cl. ............................G01c 1/06, G01c 3/00
[58] Field of Search......................356/8, 20–22, 142, 356/143; 350/8, 10, 17, 27, 33, 50

[56] References Cited

FOREIGN PATENTS OR APPLICATIONS

| | | | |
|---|---|---|---|
| 174,480 | 4/1953 | Austria | 356/142 |
| 895,221 | 11/1953 | Germany | 356/142 |
| 514,300 | 2/1955 | Italy | 356/142 |

Primary Examiner—Ronald L. Wibert
Assistant Examiner—F. L. Evans
Attorney—Kurt Kelman

[57] ABSTRACT

A telescopic instrument for optically measuring the distance of a viewed object, with automatic reduction of the measured values in the horizontal distance and simultaneous measurement of the width and height of a distant object, such as a tree trunk. In the optical path between the objective and eyepiece of the telescope is mounted a first prism whose upper edge divides the field of view into an upper and a lower part. A pendulum drum carries a measuring scale and is so arranged in the telescope housing that the visual rays of the lower part of the field of view are focused on a measuring scale section which is viewed in the lower part while the upper part of the field of view is covered by the portion of the distant object to which the telescope is directed.

2 Claims, 3 Drawing Figures

PATENTED JAN 23 1973　　　　　　　　　　3,712,737
FIG.1
FIG.2
FIG.3
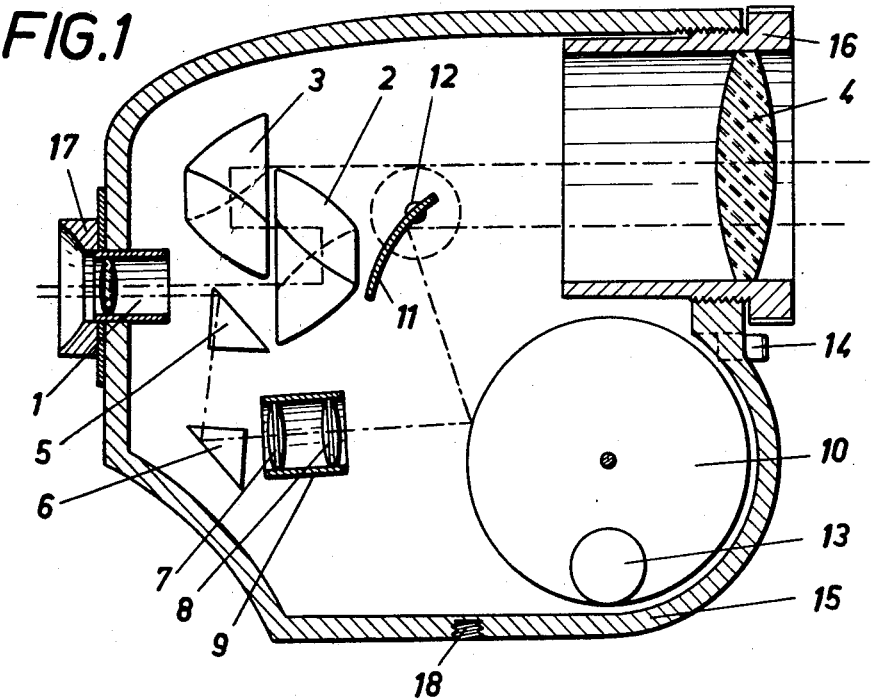
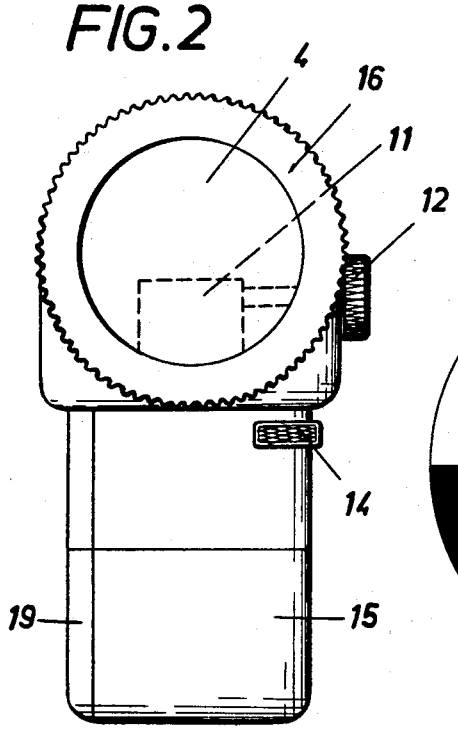
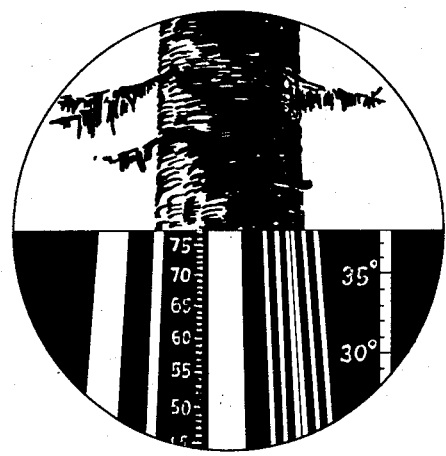

TELESCOPIC OPTICAL INSTRUMENT

The present invention relates to improvements in a type of telescopic optical instrument that has been used primarily in forestry for optically measuring tree trunks, such as disclosed in Austrian Pat. Nos. 172,305 and 174,480 whose disclosures are hereby incorporated herein by reference to avoid prolixity.

Limits are set to the usefulness of such optical instruments by the sharpness of sight of the operator. Also, the field of use of the known instruments is limited.

It is the primary object of this invention to overcome these disadvantages and to extend the field of use of the instruments to geodesic operations where the distance measurements are automatically reduced while the width and height of distant objects are measured simultaneously.

This and other objects and advantages are accomplished in accordance with the invention by combining known optical elements in a novel manner in a handy housing which may be hand-held or mounted tiltably on a tripod for focusing on portions of a distant object by suitably tilting the optical axis of the instrument towards such portions. The telescopic optical instrument comprises an eyepiece mounted at one end of the housing and an adjustable objective mounted at the end of the housing opposite to the one end. Two associated inverting prisms are arranged in the housing between the eyepiece and the objective to define an optical path therebetween to project an image received through the objective for viewing by the eyepiece. A first prism is mounted in the housing between the associated inverting prisms and the eyepiece, the prism having an upper edge in the plane of the image whereby the field of view is divided into an upper and a lower part. A pair of converging lenses is mounted in the housing for adjustment in relation to each other. A second prism is mounted between the first prism and the pair of converging lenses, and the second prism is arranged to receive the visual rays from the eyepiece in the lower part of the field of view below the edge of the first prism and to reflect them to the pair of converging lenses. A pendulum drum carrying a measuring scale on the periphery thereof is so arranged in the housing that the pair of converging lenses is focused on the measuring scale whereby the image of the measuring scale section whereon the converging lenses are focused is projected at the eyepiece in the lower part of the field of view.

The above and other objects, advantages and features of the present invention will become more apparent from the following detailed description of a now preferred embodiment thereof, taken in conjunction with the accompanying drawing wherein FIG. 1 is a schematic side elevational view, partly in section, of the telescopic optical instrument showing the essential optical elements thereof and the optical paths, FIG. 2 is a front view of the instrument, and FIG. 3 shows the field of view, with its upper and lower part as viewed at the eyepiece of the telescope, the illustrated example being that of the measurement of the diameter of a tree trunk portion far above the ground.

Referring now to the drawing, there is seen the telescope housing 15 having an eyepiece 1 mounted at one end thereof while objective 4 is mounted at the end of the housing opposite to the one end. The light rays entering into the housing through the objective are indicated in broken lines and two associated inverted prisms 2, 3 are arranged to define the optical path of the light rays between the objective 4 and eyepiece 1 to project an image received through the objective for viewing by the eyepiece. As shown, inverting prism 3 reflects the incident light rays 180° back towards the objective while inverting prism 2, which receives the reflected rays, again reflects them 180° so that they emerge therefrom parallel to the path of the incident rays but horizontally offset therefrom.

A first prism 5 is mounted in the housing between the associated inverting prisms 2, 3 and eyepiece 1. The upper edge of prism 5 is in the plane of the image and forms a sharp image in the eyepiece (see FIG. 3), thus dividing the field of view into an upper and a lower part.

A second prism 6 is mounted below the first prism to receive the visual rays of the lower part of the field of view reflected by prism 5 below its upper edge. These rays are reflected by prism 6 to a pair of converging or positive lenses 7, 8 which transmit the rays to a section of a measuring scale on the periphery of pendulum drum 10 whereon the positive lenses are focused. The converging lenses 7, 8 are mounted on tubular holder 9 for adjustment in relation to each other, as well as for adjustment in unison by movement of the entire holder in respect of the housing, such adjustments of optical elements being well known per se. These lenses project a real image of the measuring scale section in the same image plane (upper edge of prism 5) at the eyepiece, the lower part of the field of view thus showing the scale while the upper part thereof shows the distant object.

A pivotal concave mirror 11 is mounted in the housing between objective 4 and the pendulum drum measuring scale and is so arranged that a portion of the light entering through the objective is reflected by the mirror to the measuring scale section on which the converging lenses 7, 8 are focused, thus illuminating this section. The mirror position may be adjusted by pivoting the mirror around a shaft rotated by actuating knob 12.

Since the positioning of the pendulum drum is conventional, it has been only schematically illustrated by adjustable and eccentrically mounted weight 13 and push button 14 arranged to release the drum for a pendulum movement and then to set it in a desired angular position.

As shown, objective 4 is mounted adjustably in a holder 16 which is in threaded engagement with the housing so as to enable any desired positioning of the objective in relation to the eyepiece. A cup 17 is mounted over the eyepiece to facilitate viewing. A threaded socket 18 is provided on the underside of housing 15 so that the instrument may be mounted on a tripod, if desired, as is well known. As shown in FIG. 2, one of the side walls of the housing is constituted by a removable cover so as to provide ready access to the optical elements in the interior of the housing.

The operation of the instrument will be apparent from the above description of its structure and will be most fully appreciated from a consideration of FIG. 3.

The operator looking through eyepiece 1 and tilting the instrument to focus on a desired portion of a distant object, will see a field of view sharply divided by the edge of prism 5 into an upper part and a lower part, depending on the angle of viewing, i.e., the angle enclosed by the horizontal and the inclination of the telescope. Thus, the upper part of the field of view is seen to show a portion of the trunk of a tree which is sighted under an angle of 77 percent. The lower part of the field of view shows a section of the measuring scale whose values can be read along the sharp sighting edge determined by the upper edge of prism 5. Reading of these values gives the following possibilities:

1. The sighting angle may be read from the scale, either in percentages, degrees or other suitable units.

2. Optical measuring of the distance by means of differing widths of stripes and horizontal bases of differing lengths, the horizontal distance being automatically reduced since the widths of the stripes taper by the cosine of the angle of inclination of the instrument, i.e., the sighting angle.

3. Measurement of the width by tachymetric units, i.e., measuring units by which the differing widths of the stripes are defined.

We claim:

1. A telescopic optical instrument comprising
   1. a housing having two ends,
   2. an eyepiece mounted at one end of the housing,
   3. an adjustable objective mounted at the end of the housing opposite to the one end,
   4. two associated inverting prisms arranged in the housing between the eyepiece and the objective to define an optical path therebetween to project an image received through the objective for viewing by the eyepiece,
   5. a first prism mounted in the housing between the associated inverting prisms and the eyepiece,
      a. the prism having an upper edge in the plane of the image, whereby the field of view is divided into an upper and a lower part,
   6. a pair of converging lenses mounted in the housing for adjustment in relation to each other,
   7. a second prism mounted between the first prism and the pair of converging lenses,
      a. the second prism being arranged to receive the visual rays from the eyepiece in the lower part of the field of view below the edge of the first prism and to reflect them to the pair of converging lenses, and
   8. a pendulum drum carrying a measuring scale on the periphery thereof,
      a. the pair of converging lenses being focused on the measuring scale whereby the image of the measuring scale section whereon the converging lenses are focused is projected at the eyepiece in the lower part of the field of view.

2. The telescopic optical instrument of claim 1, further comprising a pivotal mirror mounted in the housing between the objective and the pendulum drum measuring scale, the mirror being arranged to reflect a portion of the light entering through the objective to the measuring scale, and means for adjusting the position of the mirror.

* * * * *